H. B. NASSOIT.
BABY CARRIAGE.
APPLICATION FILED FEB. 26, 1921.
1,413,422.
Patented Apr. 18, 1922.
2 SHEETS—SHEET 1.
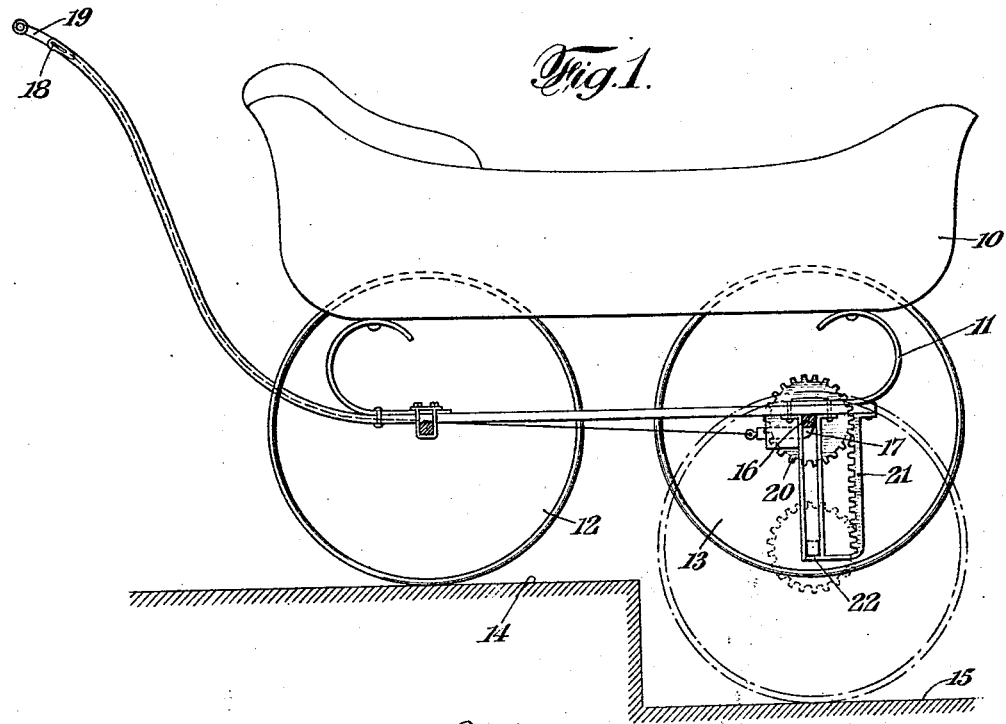
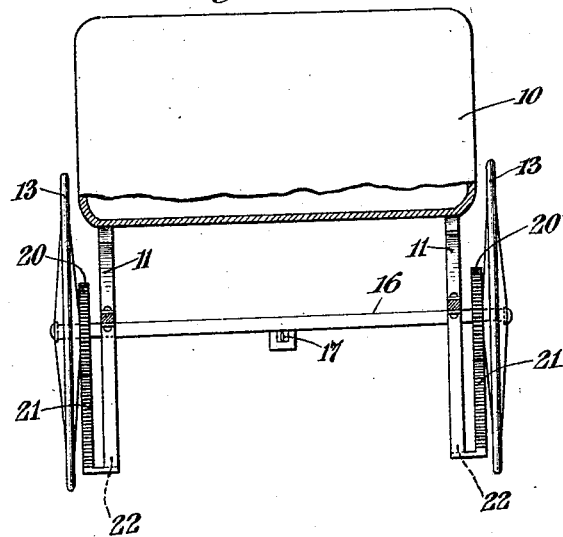
Inventor
Harry B. Nassoit
By his Attorney

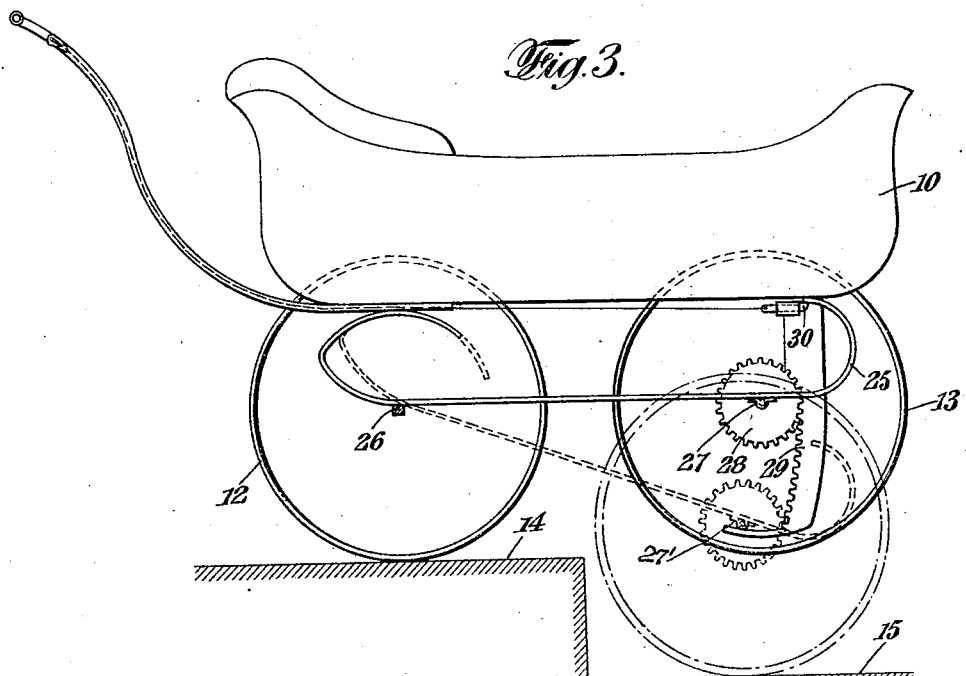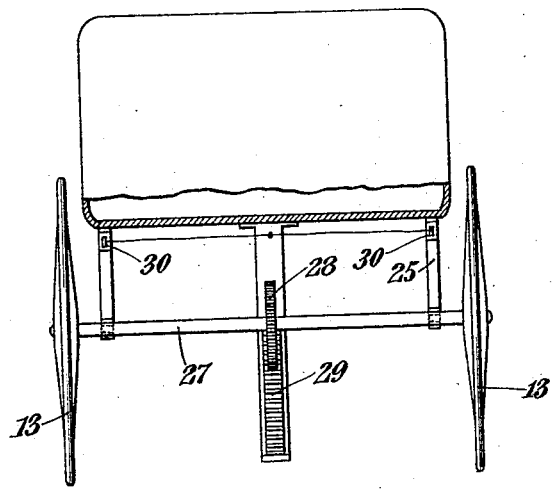

UNITED STATES PATENT OFFICE.

HARRY B. NASSOIT, OF NEW YORK, N. Y.

BABY CARRIAGE.

1,413,422.   Specification of Letters Patent.   Patented Apr. 18, 1922.

Application filed February 26, 1921. Serial No. 448,036.

*To all whom it may concern:*

Be it known that I, HARRY B. NASSOIT, a citizen of the United States, and a resident of New York, in the county of New York and State of New York, have invented certain new and useful Improvements in Baby Carriages, of which the following is a specification.

The invention relates to vehicles, more especially to baby carriages; and it has for its object to so construct a four wheel carriage that in crossing street, for example on leaving the side walk, the forward wheels of the carriage may be dropped to conform to the change in level and thus maintain the carriage substantially level and thereby avoid shock. The invention has for a further object the automatic return of the forward wheels to their normal position when the weight of the carriage is restored thereto and the carriage advanced on the new level.

To this end, the invention consists in so mounting the forward wheels that the same may be dropped downwardly at will, either together with the forward axle of the carriage or with same and a portion of the frame, the whole then swinging about the rear axle of the carriage. The mounting, moreover, may be so arranged that upon rotation of the forward wheels in advancing the carriage, the said wheels will be returned to their normal position.

The nature of the invention will, however, best be understood when described in connection with the accompanying drawings, in which—

Fig. 1 is a side elevation of a baby carriage arranged to allow the forward wheels to drop.

Fig. 2 is a front elevation thereof.

Fig. 3 is a side elevation, and Fig. 4 a front elevation of a modification in the arrangement for effecting the dropping of the forward wheels.

Similar characters of reference designate corresponding parts throughout the several views.

Referring to the drawings, 10 designates the body of a carriage of any suitable type, which body may be secured in well-known manner or special manner upon a resilient frame or the like 11, the whole being mounted to move on a pair of rear wheels 12 and a pair of forward wheels 13. The latter wheels in the present embodiment, however, are arranged to be displaceable relatively to the carriage in manner hereinafter set forth. For example, they may be arranged to drop directly downwardly to assume the position indicated in dotted lines, Fig. 1, for the purpose of conforming to a change in level, as in crossing from a side-walk 14 to a street 15 which is, as a rule, at a lower level. The carriage will thus ride off substantially level and shock is avoided in making the change. The arrangement, moreover, is such that as the carriage advances on the new and lower level the forward wheels will be restored automatically to their normal position, indicated in the full lines, Fig. 1.

To permit of such change in position of the forward wheels 13 relatively to the carriage, the forward axle 16 of the carriage, carrying the said pair of forward wheels, is arranged to be dropped bodily when desired, as, for example by releasing a spring-urged catch 17 operated in any well-known manner from a hand member 18 mounted conveniently on the carriage handle 19. The wheels 13 for this purpose are preferably provided with pinions 20 whose teeth mesh with the teeth of a downwardly extending rack 21 secured to the frame. In this manner, as the axle is released, the pinions ride along the teeth of the rack until the wheels are stopped in their descent by the street 15 or by the axle coming in contact with a stop 22 of the rack frame. As soon as the forward wheels rotate, in the advance of the carriage, the pinion teeth engaging the rack teeth will return the wheels to their normal position, and the pair of rear wheels 12 will have in the meantime reached the level of the street 15. Catch 17 will be pushed aside during the ascent of the axle and then snap over same to again retain the axle in its normal position.

In Figs. 3 and 4, the resilient portion 25 of the frame is differently constructed, that is to say, it is made separable so as to allow of dropping a portion thereof from the body portion or rather of swinging same about the rear axle 26. The forward axle 27, rotatable in bearing 27', carries in this embodiment a single pinion 28, rather than a pair of pinions as in the former embodiment; and said axle, pinion and wheels are rotatable as a unit relatively to the frame and the rack member 29 is made of arcuate form to accommodate the motion about axle 26. To permit the dropping of the resilient frame portion 25, a spring-urged catch member 30 is withdrawn from its position of locking the upper turned-in end of the said resilient frame portion. The forward wheels are restored to normal position in manner similar to those shown in Fig. 1.

I claim:—

1. The combination with a frame of a baby carriage, of a pair of rear wheels and a pair of forward wheels upon which said frame is mounted, the forward wheels being displaceable relatively to the carriage, and means operating through the forward motion of the carriage to positively and automatically restore the said wheels to their normal position.

2. The combination with a frame of a baby carriage, of a pair of rear wheels and a pair of forward wheels upon which said frame is mounted, said forward wheels having a rack and pinion engagement with the frame whereby, when released, said wheels will drop, and upon the carriage being advanced will return to their normal position relatively to the frame.

3. The combination with a frame of a baby carriage; of a pair of rear wheels, an axle and a pair of forward wheels carried thereby, said frame being mounted on said wheels, pinions carried at the opposite ends of said axle by said forward wheels, racks carried by said frame at each side thereof for engagement with the corresponding pinions, and means to release said axle.

4. The combination with a frame of a baby carriage; of a pair of rear wheels, an axle and a pair of forward wheels carried thereby, said frame being mounted on said wheels, pinions carried at the opposite ends of said axle by said forward wheels, racks carried by said frame at each side thereof for engagement with the corresponding pinions, means to release said axle, and means to guide same.

5. The combination with a frame of a baby carriage; of a pair of rear wheels, an axle and a pair of forward wheels carried thereby, said frame being mounted on said wheels, pinions carried at the opposite ends of said axle by the said forward wheels, racks carried by said frame at the opposite ends thereof, having a bottom stop and a guide for the axle, said racks being adapted for engagement with the corresponding pinions, and means to release said axle.

6. The combination with a frame of a baby carriage; of a pair of rear wheels, an axle and a pair of forward wheels carried thereby, said frame being mounted on said wheels, pinions carried at the opposite ends of said axle by said forward wheels, racks carried by said frame at the opposite ends thereof, having a bottom stop and a guide for the axle, said racks being adapted for engagement with the corresponding pinions, and means to release said axle and to automatically lock same in its normal position.

Signed at New York in the county of New York and State of New York this 23rd day of February A. D. 1921.

HARRY B. NASSOIT.